(12) United States Patent
Kongsvik

(10) Patent No.: US 11,532,239 B2
(45) Date of Patent: Dec. 20, 2022

(54) SYSTEM AND METHOD FOR STUDENT ENGAGEMENT AND ACTIVE LEARNING

(71) Applicant: John Kongsvik, Santa Fe, NM (US)

(72) Inventor: John Kongsvik, Santa Fe, NM (US)

( * ) Notice: Subject to any disclaimer, the term of this patent is extended or adjusted under 35 U.S.C. 154(b) by 974 days.

(21) Appl. No.: 16/273,010

(22) Filed: Feb. 11, 2019

(65) Prior Publication Data

US 2020/0258406 A1   Aug. 13, 2020

(51) Int. Cl.
| | | |
|---|---|---|
| G09B 19/00 | (2006.01) | |
| G09B 1/10 | (2006.01) | |
| G09B 19/02 | (2006.01) | |
| G09B 1/14 | (2006.01) | |
| G09B 7/00 | (2006.01) | |

(52) U.S. Cl.
CPC ............ *G09B 1/10* (2013.01); *G09B 1/14* (2013.01); *G09B 7/00* (2013.01); *G09B 19/02* (2013.01)

(58) Field of Classification Search
None
See application file for complete search history.

(56) References Cited

U.S. PATENT DOCUMENTS

| | | |
|---|---|---|
| 3,153,861 A | 10/1964 | Rice |
| 3,190,014 A | 6/1965 | Rhodes |
| 3,566,482 A | 3/1971 | Morchand |
| 4,666,160 A | 5/1987 | Hamilton |
| 5,701,694 A * | 12/1997 | Atkinson ............... G09F 3/20 40/493 |
| 5,820,386 A | 10/1998 | Sheppard, II |
| 6,895,214 B2 | 5/2005 | Murphy |
| 2002/0078067 A1 | 6/2002 | Collins et al. |
| 2003/0113697 A1 | 6/2003 | Plescia |
| 2007/0020604 A1 | 1/2007 | Chulet |
| 2007/0165649 A1 | 7/2007 | Moritz |
| 2008/0010792 A1* | 1/2008 | Pryd-Kakuk .......... A61G 17/08 27/1 |
| 2008/0182230 A1 | 7/2008 | Stone |
| 2008/0263915 A1* | 10/2008 | Wardell .................. G09F 7/04 40/1 |
| 2010/0009332 A1 | 1/2010 | Yaskin et al. |
| 2017/0101218 A1* | 4/2017 | Rodrigues ............ B65D 85/70 |

* cited by examiner

*Primary Examiner* — James B Hull
(74) *Attorney, Agent, or Firm* — Loza & Loza LLP; Kevin L. Soules

(57) ABSTRACT

A system, apparatus, and method for using a teaching tool comprises a housing, at least one guide rail formed on an inner surface of the housing, at least one compartment configured in the housing, at least one engagement tool, and a base connected to the housing, wherein the teaching tools can be used for the engagement of students in classroom activities.

13 Claims, 10 Drawing Sheets

SYSTEM AND METHOD FOR STUDENT ENGAGEMENT AND ACTIVE LEARNING

TECHNICAL FIELD

The present embodiments are generally related to educational tools. The embodiments are further related to methods and systems associated with teaching. The embodiments are further related to methods and systems for engaging students. More specifically, the embodiments are related to methods and systems for student engagement active learning tools.

BACKGROUND

Student engagement is a critical factor in improving educational outcomes. As such teachers employ various methods to attempt to encourage student engagement in classroom activities. However, well known methods for engaging students have various problems.

For instance, in a classic example, a teacher may ask a question and then request that students raise their hand to provide the answer. While this method does require student engagement, by nature some students are more extroverted, and thus more likely to raise their hand. Likewise, some students may refuse to raise their hand, even if they know the answer to the question, because they are shy or lack confidence.

In another example, students might be divided into smaller groups and asked to share a story or solve a problem. This type of arrangement reduces the pool of students working on the task and thus encourages even shy students to engage in the exercise. However, more extroverted students will naturally tend to dominate the exercise by speaking more than students who are less naturally inclined to speak or participate. Participation in such activities has a demonstrable impact on the quality of the lesson for the student. Thus, students who are naturally disinclined to participate, generally take less from lessons that require participation, than those students that actively engage in the exercise.

Accordingly, there is a need in the art for systems and methods that aid and improve in student engagement in classroom activities.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide educational tools.

It is another aspect of the disclosed embodiments is to provide methods and systems associated with teaching.

It is another aspect of the disclosed embodiments is to provide methods and systems for engaging students.

It is yet another aspect of the disclosed embodiments to provide methods and systems for student engagement active learning tools.

For example, in the embodiments disclosed herein a system and method for a teaching aid system comprises a housing, at least one compartment configured in the housing, at least one engagement tool, and a base connected to the housing is disclosed.

The housing further comprises at least one retaining strut formed on an exterior wall of the housing and at least one slot formed in a lip of the housing. The system further comprises at least one identification plate engaged to the exterior wall of the housing with the at least one retaining strut. A coating can be formed on the identification plate, the coating comprising at least one of a blackboard coating and a whiteboard coating.

The base connected to the housing further comprises a dowel connecting the base to the housing and can also include a race and bearing assembly that allows the housing to be rotated.

In an embodiment the at least one engagement tool further comprises at least one of: stones, sticks, timers, stickie notes, markers, and dice.

The at least one compartment further comprises one of: four equally sized compartments, one large compartment and two smaller compartments, two equally sized compartments, and one compartment.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
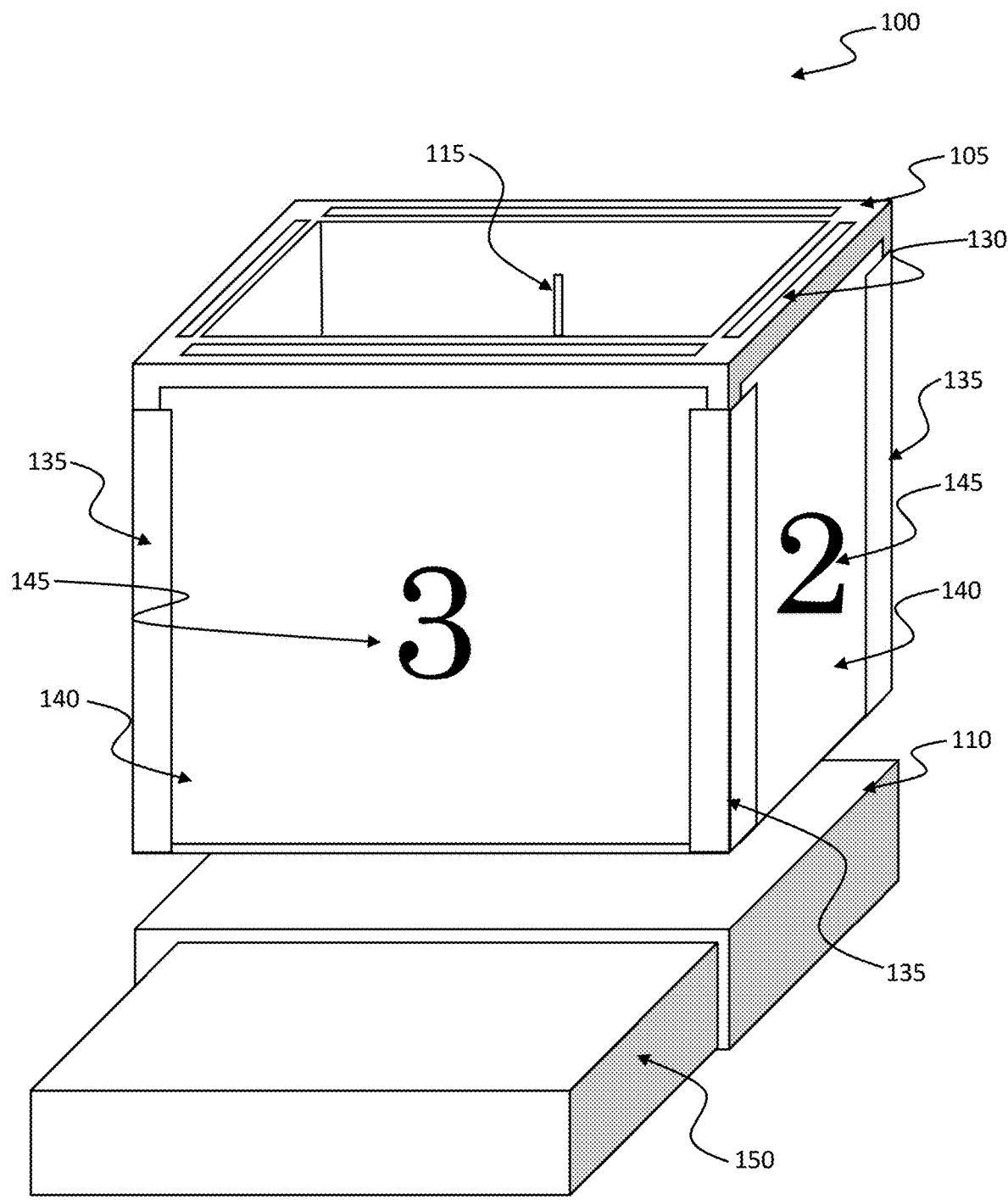
FIG. 1 depicts an teaching aid in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter, with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, Aft AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, Aft BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

The embodiments disclosed herein provide a system, method, and apparatus designed to improve student participation and engagement in classroom activities. The embodiments give educators a means of controlling student engagement when students are broken into groups, and for ensuring an equal measure of participation for each student, even when the educator is working with a large number of students.

An embodiment of an exemplary system 100 is illustrated in FIG. 1. The system 100, includes an outer housing 105 connected to a base 110. The outer housing 105, shown in FIG. 1 is formed in the shape of a cube. The cube shape is ideal for groups of four students where each of the four students will have one side of the cube facing them. However, it should be understood that in other embodiments, the outer housing 105 can be configured in other shapes. In other embodiments, the outer housing 105 can be configured to be adjustable such that the outer housing 105 can be rearranged into new shapes according to variations in the lesson plan and/or the number of students in the group.

The outer housing 105 includes a series of one or more guide rails 115 formed on the inner surface of the vertical and/or bottom walls. The guide rails 115 are configured to fit with a series of one or more compartments 120 (shown in FIG. 2) designed to fit inside the outer housing 105.

Figure 4A:
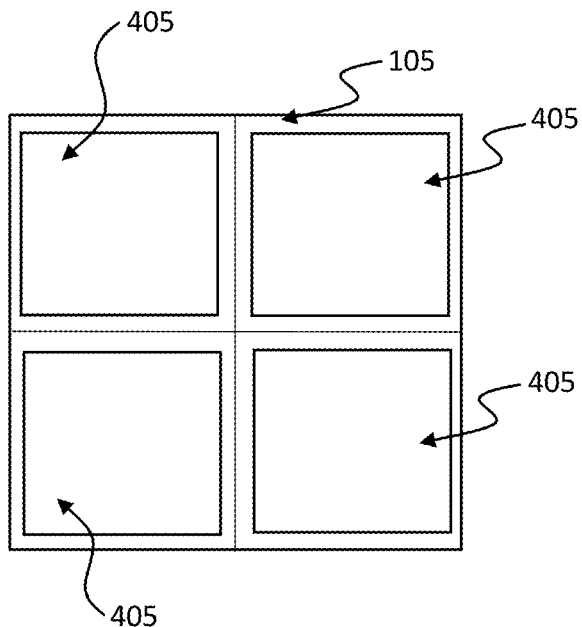
FIG. 4A-4D depict top views of various arrangements of a teaching aid in accordance with the disclosed embodiments.
Figure 4B:
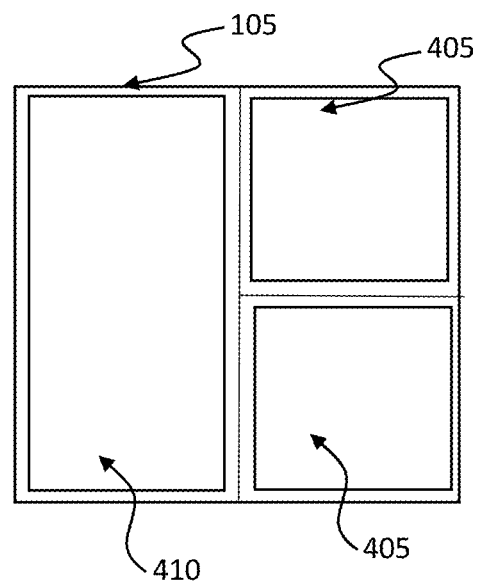
Figure 4C:
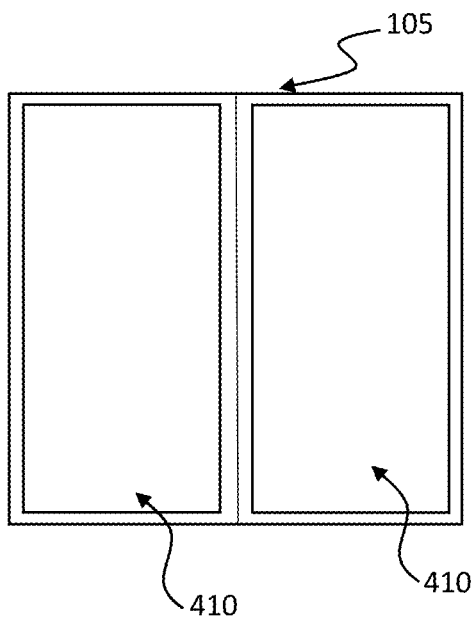
Figure 4D:
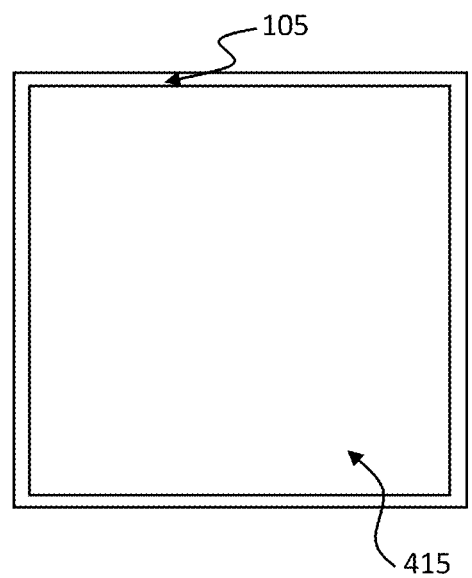

The compartments 120 can be embodied in a number of ways, some of which are illustrated in the top view provided in FIGS. 4A-4C. For example, in certain embodiments the compartments 120 can comprise a series of four equivalently sized compartments 405 such that the four compartments occupy an equal amount of space in the outer housing 105. In other embodiments, one larger compartment 410 of a size roughly, or exactly, equivalent to the two smaller compartments can be used such that the two smaller compartments 405 occupy one half of the space in the outer housing 105 while the larger compartment 410 occupies the other half. In yet another embodiment, two compartments 410 can each occupy half of the space in the outer housing 105, or a single compartment 415 can be configured in the outer housing 105.

It should be understood that in other embodiments, other arrangements of compartments can be used, including simply utilizing the space inside the outer housing 105. In some embodiments, one or more of the inner compartments can be configured in a nested arrangement such that additional compartments can be inserted therein. Likewise, the compartments can be formed in larger or smaller shapes, and/or with different shapes, in accordance with design considerations.

In other embodiments, the arrangement of compartments 120 can include other variations. For example, the compartments 120 can be configured to be removable or immovable. In cases where the compartments are removable, a releasable latch 125 can be provided on the outer housing 105 to temporarily hold the compartment 120 in place.

In certain embodiments, the upper rim of the vertical housing can include an overhang with one or more slots 130 formed therein. The vertical exterior corners of the outer housing 105 can further include retaining struts 135. An identification plate 140 can be configured to fit through the slot 130. The identification plate 140 can be installed in front of one of the exterior vertical walls of the outer housing 105, and is held in place by the lip of the slot 130 and one or more of the retaining struts 135. An identification plate 140 can be provided for each side of the outer housing 105.

The identification plate 140 can be formed from plastic, and/or whiteboard, and/or can be coated in blackboard material, whiteboard material, or other such material upon which an identifier 145 can be provided. In other embodiments, the identifier 145 can be permanently affixed to the outer surface of the outer housing 105. In other embodiments, a permanent identifier, such as a number, letter, etc. can be permanently affixed to the outer surface of the outer housing 105, and when necessary, the identification plate 140 can be inserted in front of the outer surface so that the permanent identifier is obscured and a new identifier 145 is externally visible.

The identification plate 140 can be removed from one surface of the outer housing 105 and inserted in place in another of the sides of the outer housing 105. Additionally, a similar identification plate 140 can be provided for each of the sides (e.g. four sides as shown in FIG. 1) of the outer housing 105. Each of the identification plates 140 can be of a different color, and can include a different color on each of the front and back surfaces. Similarly, each of the identification plates 140 can include a different identifier 145 (e.g. a number, a letter, a fictional character, an animal, etc.) and a different identifier 145 can be included on the front and back of the identification plate 140. In use, the identifier 145 associated with a certain side of the outer housing 105 can be used to identify the student, or group of students, at whom that identification plate 140 is pointing.

The base 110, connected to outer housing 105, can include a drawer 150 formed therein. The drawer 150 can be configured to store supplies or engagement tools as further detailed herein. For example, in certain embodiments the drawer 150 can be used to store stickie notes. In other embodiments, the drawer 150 can be used to store excess or replacement engagement tools.

Figure 3:
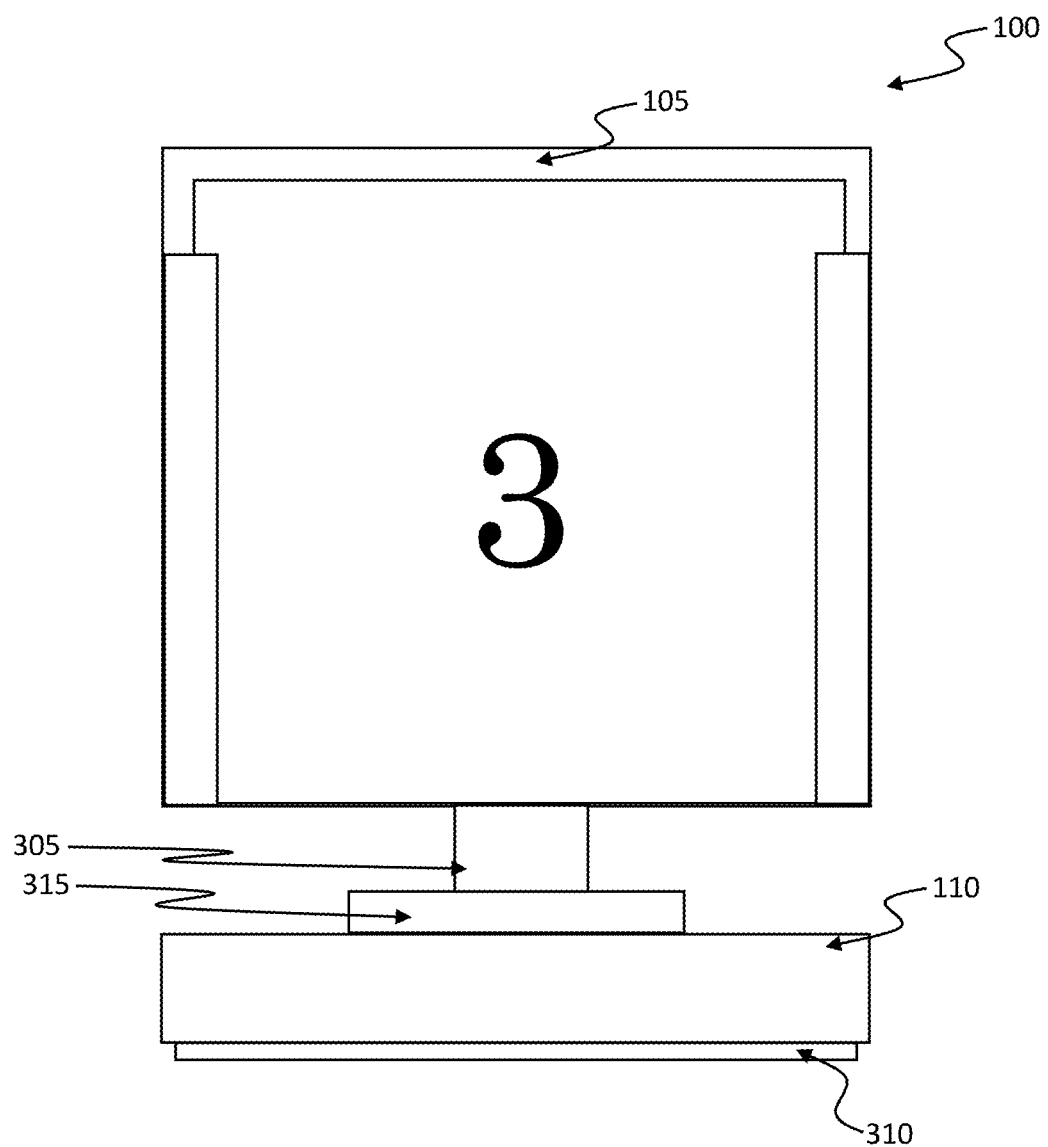
FIG. 3 depicts a side view of a teaching aid in accordance with the disclosed embodiments.

The bottom surface of the outer housing 105 can be connected to base 110, as shown in the side view of system 100 illustrated in FIG. 3. The base 110 serves as the interface between the system and, for example, a desk. The base 110 can be configured with a dowel 305 that extends between the base 110 and the outer housing 105. The dowel 305 can be permanently affixed or can allow the housing to rotate in relation to the base 110. The base 110 can include a high friction coating 310 (e.g. plastic, rubber, etc.) on its bottom surface to prevent the base 110 from sliding or moving, particularly when the outer housing 105 is being independently rotated.

Rotation of the system 100 can be achieved in a number of ways. In one embodiment, the base 110 is fitted with a race and bearing assembly 315. The dowel 305 can be engaged in the race and bearing assembly 315 on one end, and fixedly attached to the bottom surface of the outer housing 105 on the other end. Thus, the dowel 305 can rotate in the race and bearing assembly 315 and, by extension, impart rotation on the outer housing 105. Stops can be provided in the race and bearing assembly 315 such that the outer housing 105 naturally stops at each 90 degree rotation, in the case of a four-sided outer housing, such that the outer housing can be naturally rotated in 90 degree increments. In other embodiments, where the outer housing has a different number of sides, the stops can be incorporated for different degrees of rotation.

In certain embodiments, the rotation of the system can be controlled electronically. In such embodiments, a motor can be attached to the dowel 305 in order to rotate the device with a controller or other such device. The controller can comprise a mobile device or hardwired device as further detailed herein.

In yet another embodiment, the base 110 can be fixedly connected to the outer housing 105 with the dowel 305 or other such structure. In such an embodiment, the base 110 and outer housing 105 are not configured to rotate independently of one another.

Figure 2:
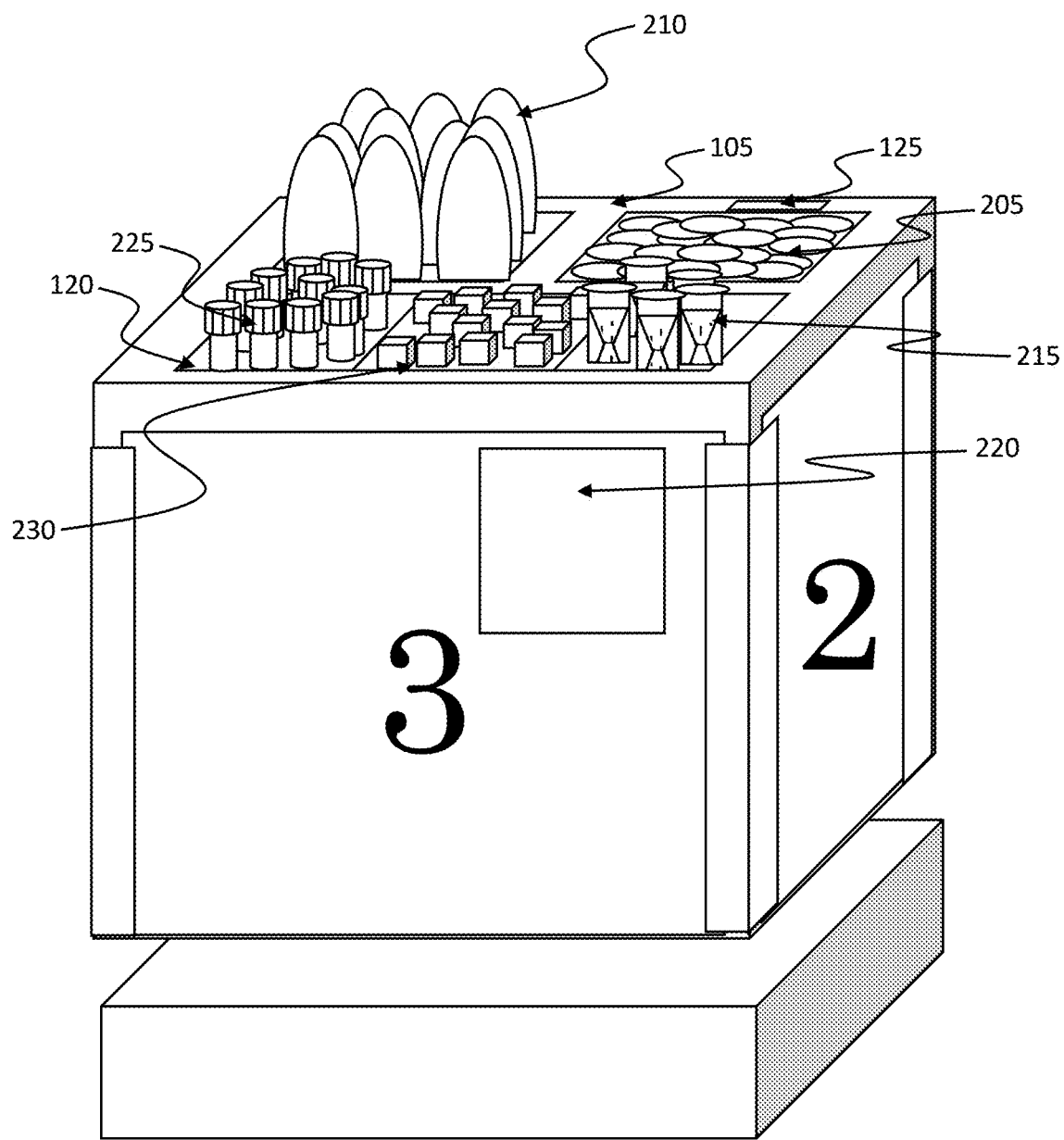
FIG. 2 depicts another embodiment of a teaching aid in accordance with the disclosed embodiments.
Figure 5:
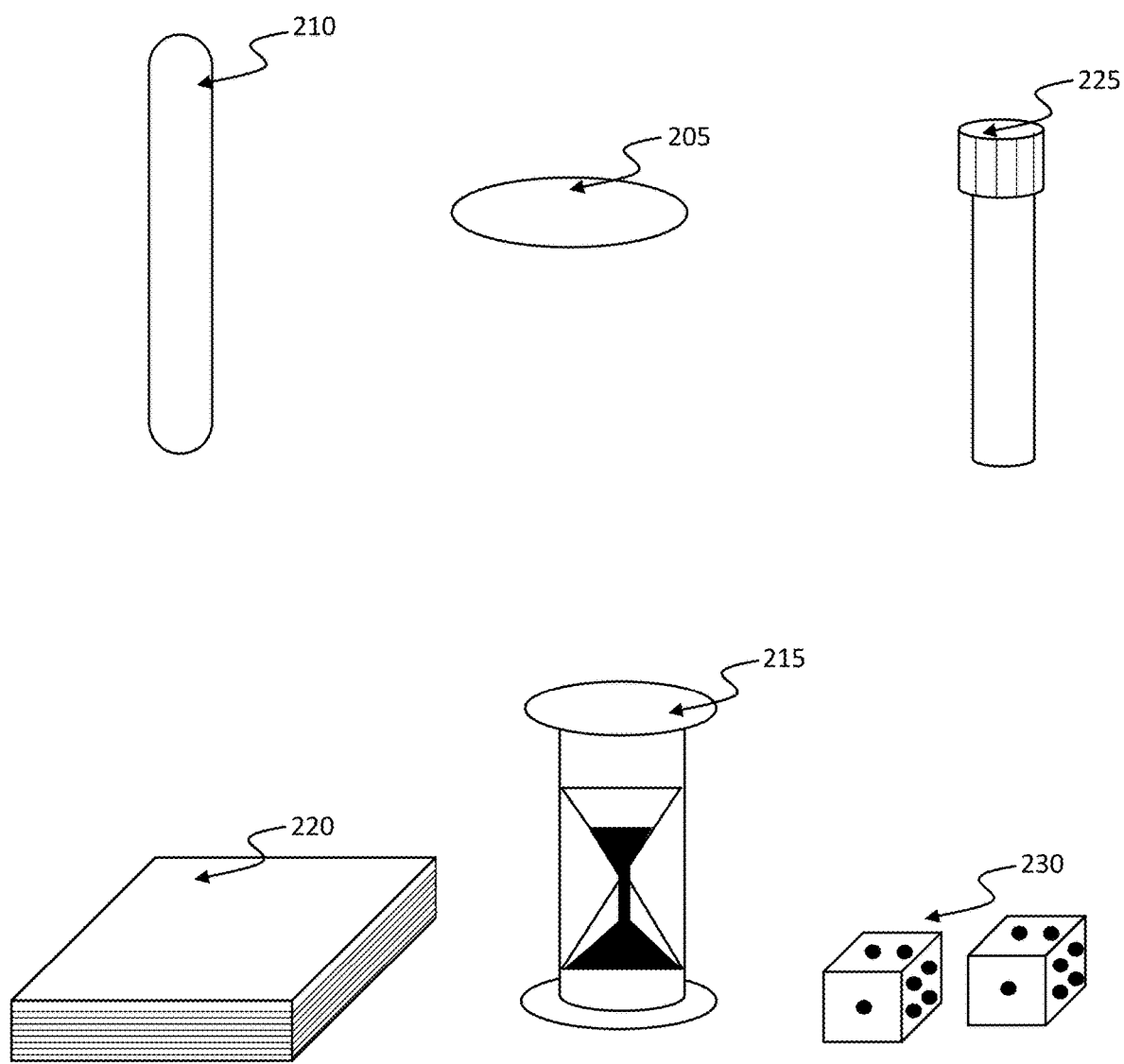
FIG. 5 depicts various engagement tools in accordance with the disclosed embodiments.

FIG. 2 illustrates an exemplary embodiment of the system 100, wherein various engagement tools are stored in the compartments 120. In certain embodiments, engagement tools can include stones 205, sticks 210, timers 215 (e.g. sand timers, digital timers, etc.), stickie notes and/or post-it notes 220, markers and/or highlighters 225, dice 230, etc. Individual versions of the engagement tools are illustrated in FIG. 5. Each of the engagement tools can be used to facilitate one or more engagement strategies with students. As such, each of the engagement tools can be further configured in a variety of ways.

For example, the group of one or more sticks (or "talking sticks") 210 can be configured to have matching or staggered lengths, one or more colors, and/or one or more shapes. In certain embodiments, the talking sticks 210 can comprise small popsicle-stick like objects. The sticks 210 can include variations in color (e.g. red, blue, green, yellow, etc.), variations in detail (e.g. striped, dotted, etc.), and various other identifying marks (e.g. numbers, letters, etc.).

In practice, the talking sticks 210 can be used to keep track of which student is sharing and what that student is sharing. In the embodiments disclosed herein, the talking sticks 210 can be used to encourage students to talk to one another and consciously pay attention to this task.

This goal can be achieved in a number of ways. In one example, each student in a group chooses a certain set of sticks 210. They can randomly choose (for example 6) or choose all of one color/shape/design. Every time a student shares something with their group, they put one of their sticks 210 down. This provides a visual indicator to the instructor who can see which students are sharing, and provides a way for each of the students in the group to learn to allow each student to share in equal measure.

In another exemplary embodiment, each person in the group chooses one set of sticks 210. The teacher can provide statements regarding a story, with which the students are familiar. If the student believes the instructor's statement about the story is true, the student is instructed to hold up the red stick 210. If they believe the statement is false, they are instructed to raise the blue stick 210, and if they do not know, they are instructed to raise the green stick 210 (note the assignment of stick color is exemplary). This exercise forces the students to actively engage while the teacher is talking. From the teacher's perspective, it allows them to see what the students are thinking without having to put any individual student on the spot.

In another embodiment, stones 205 (or "talking stones") can be configured to have matching or varied shapes, matching or varied sizes, and/or one or more colors. The talking stones 205 are small stones, or stone-like objects (e.g. marbles, balls, rubber balls, magnets, etc.). The stones 205 can include variations in color (e.g. red, blue, green, yellow, etc.), variations in detail (e.g. striped, dotted, etc.), and various other identifying marks (e.g. numbers, letters, etc.).

The talking stones 205 can comprise small stone-like objects which can be used to keep track of who is sharing and what that person is sharing, as with the talking sticks 210. The objective is to encourage students to talk to one another and consciously pay attention to this task.

This goal can be achieved in a number of ways. In one example, each person in a group chooses a certain set of stones 205. They can randomly choose (for example 6) stones 205, or can choose all of one color/shape/design. Every time someone shares something with their group, they put one of their stones 205 down. As with the talking sticks 210, the talking stones 205 can be used to facilitate active student engagement in participatory exercises, and other classroom activities.

In another embodiment, stickie notes 220 can be used. The stickie notes 220 can comprise post-it notes that the teacher uses to engage students during a lesson. The stickie notes 220 can have one or more sizes, one or more shapes, and/or one or more colors.

In certain embodiments, the stickie notes 220 can be used for pre-reading instruction, during-reading, post-reading exercises, brainstorming, as exit tickets, for formative assessments, etc. For example, any time the teacher wants the students to contribute something in writing, she can ask them to take a stickie note 220 from the system and write something on it, in accordance with the task required. The instructor can further ask the students to attach the stickie 220 with the writing, to other elements of the system (e.g. another student's colored talking stick 210), or classroom objects as required for the lesson.

In another embodiment, markers 225 (including highlighters, color markers, pencils, pens, or other writing tools), can be provide. The markers 225 can come in different colors (e.g. blue, green, red, orange, yellow, purple, black, brown, and yellow). The markers 225 can further have matching or staggered lengths, one or more colors, and/or one or more shapes.

The markers 225 can be used to write on the stickies and on the facades of the outer housing 105, or identification plates 140. In certain cases, students can be instructed to use certain markers 225 for certain writing tasks and other colored markers for other tasks. Color coordination between the markers 225, stickies 220, talking stones 205, and talking sticks 210 provide additional means for teachers to engage students in lessons.

In another embodiment, dice (or "talking dice") 230 can be provided that include one more sizes, two or more sides, and/or one or more colors. In certain embodiments, the talking dice 230 are 4, 6, and 8 sided dice, with two pair of each being provided with the system 100.

The dice 230 can be used for a host of exercises including choosing questions to ask/answer, deciding who participates in a given activity, choosing a word or practice problem to do, etc. For example, at any point, the teacher may say, "take out your dice, roll them, and ask your partner the question that corresponds to the number your rolled."

In another embodiment, one or more timers (or "talking timers" 215) can be provided. The timers 215 can include sand timers, digital timers, or other such timers. The timers 215 are used to support student engagement. Any number of timers 215 with varying associated times can be provided. In certain embodiments four timers with timer lengths of 30 seconds, 45 seconds, 60 seconds, and 90 seconds can be provided.

In some exemplary methods, the timers can be used in several ways. For example, the teacher can choose to use the timers 215 during class to create wait time, to create talk time, and to create task time. These times can be used in certain ways. In a first example, a think/wait time is provided. The teacher can, for example, pose a question and ask the students to turn over their timers 215 for 30 seconds of thinking time. Once the timer is up, the teacher will call on a student.

In another example, the timers 215 can be used to define a talk time. In this case, the teacher poses a question and instructs one student to flip over the timer 215. That student is instructed to discuss the question while the sands are running. Once the sands stop running, the student stops sharing.

In another example, the timers 215 can be used to define task time. In this example, the teacher can give an individual student, pairs of students, or larger groups of students a task. The teacher can instruct the students to flip over a sand timer 215 to help them keep track of the time it takes them to complete the task.

While these tools are all associated with the systems disclosed herein. Additional tools can also be incorporated with, and stored in, the system without departing from the spirit or scope of the embodiments disclosed herein. It should be further understood that multiple of the engagement tools can be used in concert to provide additional teaching functions.

Variations in compartment configurations and engagement tools are intended to give the teacher a wide variety of options for utilizing student engagement strategies, with the systems and methods disclosed herein. For example, the teacher may decide to begin using the system 100 with only talking stones 205, as a way to introduce the engagement concepts associated with the system 100. Once the students have mastered the talking stones 205, the teacher may elect to add an additional container 120, with the talking sticks 210, for example, as more complex lessons demand additional engagement tools. In addition, the compartments 120 are removable, which gives the teacher greater control over what tools students should use at any given time during a lesson. Thus, use of one or more engagement tool can also be used to improve student accountability. For example, if each group of students is given a container 102 with 24 talking stones, they should hand in a container 120 with an equal number of stones.

Figure 6:
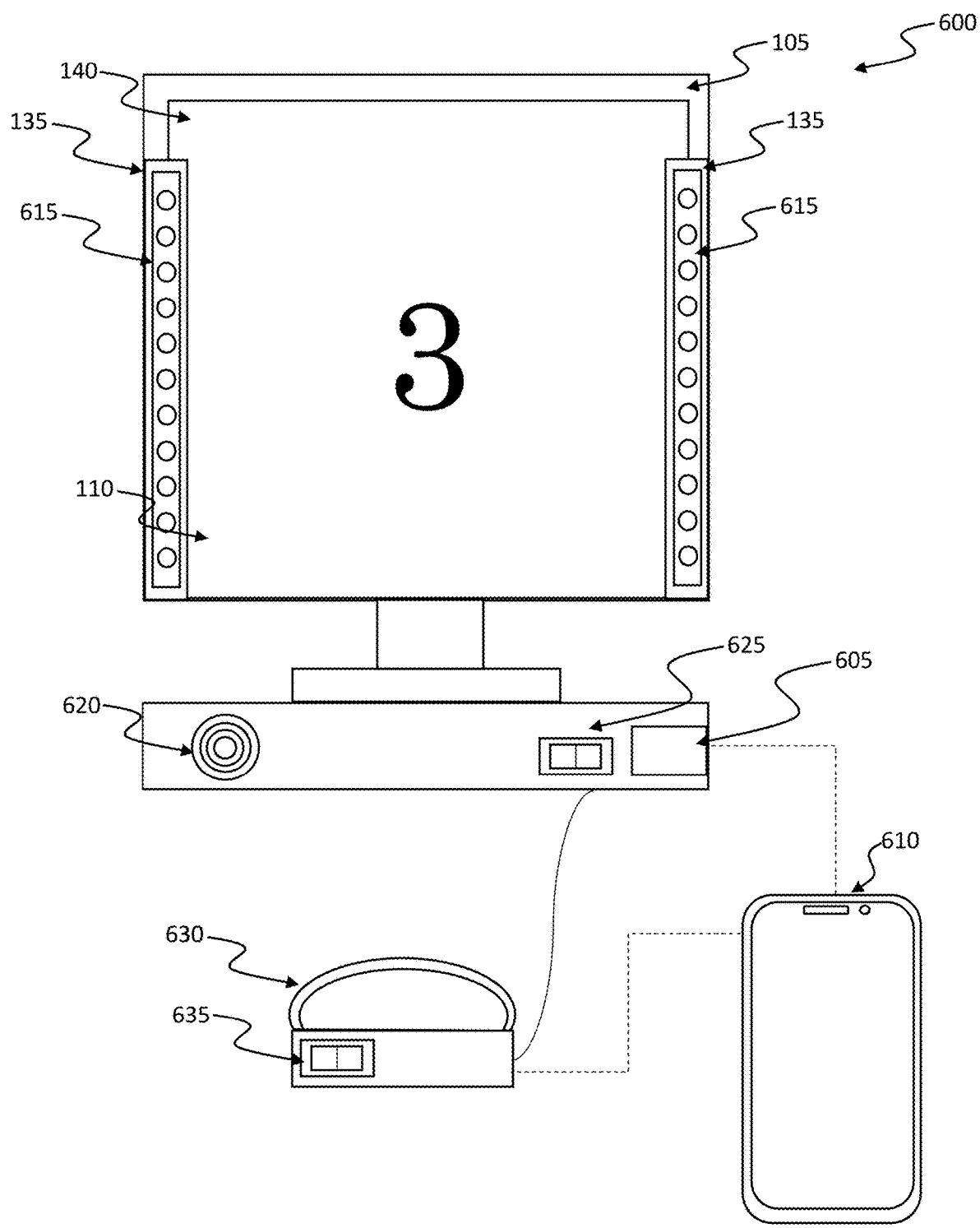
FIG. 6 depicts another embodiment of a teaching aid in accordance with the disclosed embodiments.

FIG. 6 illustrates an embodiment of a system 600 that incorporates visual and audio stimulus features along with additional control functionality. The system 600 generally includes the outer housing 105 and base 110. The base 110 can be further configured to include a power supply either via external connection to a wall socket or a battery. The base 110 can be configured with a receiver module 605. The receiver module 605 can be configured as a Bluetooth receiver, wireless internet receiver, or other such receiver. The receiver 605 can be configured to receive instructions provided by a mobile device 610.

The mobile device 610 can include a graphical user interface (GUI) that allows an instructor to control various audio and visual displays configured on the system 600. For example, the GUI can allow the instructor to rotate the direction of the outer housing using the mechanical systems (e.g. a motor connected to the power supply) as disclosed herein. In addition, the mobile interface can allow the instructor to activate a light bar 615 arranged on the retaining strut 135. A light bar 615 can be provided on each of the retaining struts 135 such that each of the sides of the system 600 facing a student includes light bars 615 directed to that student. In other embodiments, the identification plates 140 can comprise LED screens. Each light bar 615 can provide lights of a different color, for example associated with a color of the identification plate 140. In other embodiments, one of the light bars 615 facing each student can provide a red light indicator and the other of the light bars 615 can provide a green light indicator. The GUI provided on the mobile device 610 can allow the instructor to select which color and/or which light bars 615 (or LED screen) to activate. For example, if the student facing identification plate "3" correctly answers a question, the instructor can activate the light bar 615 (or LED screen) directed toward that student.

In addition, the GUI on mobile device 610 can be used to control a loudspeaker 620 configured in the base 110. In certain embodiments, each side of the base 110 can include a loudspeaker 620, so that each student has a loudspeaker 620 directed to them. The mobile device 610 can store a selection of tones that can be played through the loudspeaker 620. In other embodiments, the instructor can use the microphone on the mobile device to provide audio instructions to the student via the loudspeaker 620.

The light bars 615 and loudspeaker 620 can be turned on an off with a hard switch 625 on the base 110.

A student buzzer 630 can also be included in the system 600. The student buzzer 630 can comprise a battery operated switch that includes a wired or wireless connection to the receiver module 605 and a wireless connection to the mobile device 610. The student buzzer 630 can be powered via a battery, or via the wired connection to the power source associated with the base 110. The student buzzer 630 can include a hard switch 635 that allows the student buzzer to be turned on and off.

The student buzzer can provide a depressible contact so that when the student presses down on the student buzzer 630, a signal can be sent to the receiver module 605 which can in turn activate the loudspeaker 620 and/or the light bar 615. In addition, upon depression of the student buzzer 630, a signal can be sent to the mobile device 610 which can provide an alert in the GUI that the student depressed the student buzzer 630.

It should be understood that in certain embodiments, each student using the system 600 can be provided a student buzzer 630. Each of the student buzzers 630 can include a unique identifier that allows that buzzer to be properly identified by the mobile device 610. It should be further appreciated that in certain cases, multiple systems 600 may be deployed during an in class exercise. Thus, each system 600 can include an identifier as can each student buzzer, allowing the instructor to properly identify each system 600, and each student buzzer 630 via the GUI of the mobile device 610.

Figure 7:
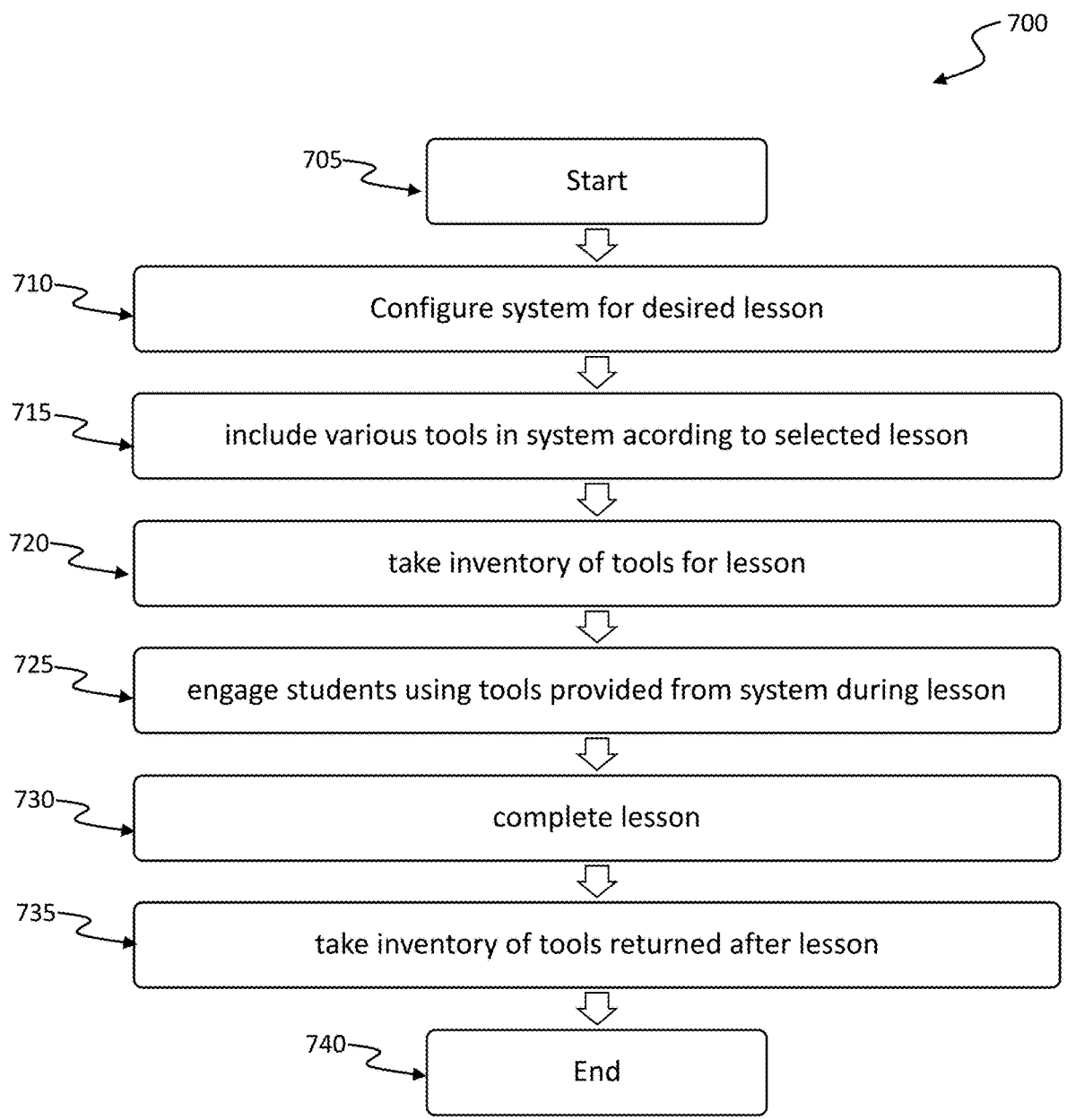
FIG. 7 depicts a flow chart illustrating steps associated with a student engagement method in accordance with the disclosed embodiments.

FIG. 7 illustrates steps associated with a method 700 utilizing the system 100, in accordance with the disclosed embodiments. The method begins at 705. At step 710 the system 100 can be configured for the desired lesson. This configuration can include, selecting the number of groups, and using the appropriate number of systems 100 (e.g. 4 groups of four, requires the use of 4 systems 100), selecting identifiers for each group, selecting the tools that will be included in the system 100 for the lesson planned, and distributing the systems to group of students.

Specific tools for the planned lesson can be selected at 715, and inventory of the selected tools can be taken as shown at 720. This can be used as a means for student accountability at the completion of the exercise. Once the system 100 has been configured and inventory of the tools is taken, the systems 100 can be distributed to each group of students. The students can adjust the system so that the correct identifier is facing each group.

At step 725, the teacher can proceed with the lesson as planned. This can include using the various engagement tools provided in the system 100 to facilitate student participation in the lesson as outlined above. The lesson can be completed at step 730, at which point, inventory of the tools can again be taken at 735. With the lesson complete the method ends at 740.

Figure 8:
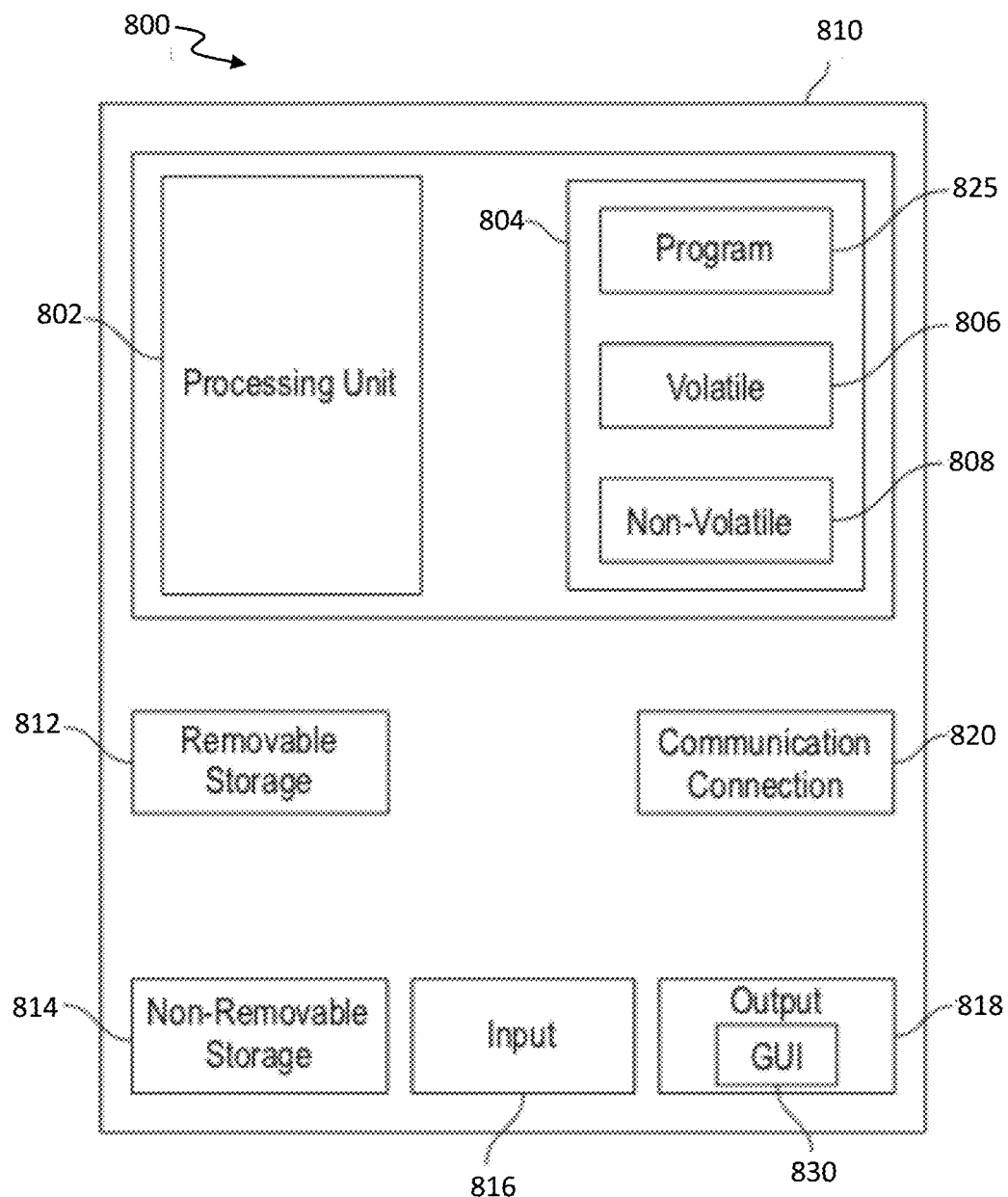
FIG. 8 depicts a block diagram of a computer system which is implemented in accordance with the disclosed embodiments.
Figure 9:
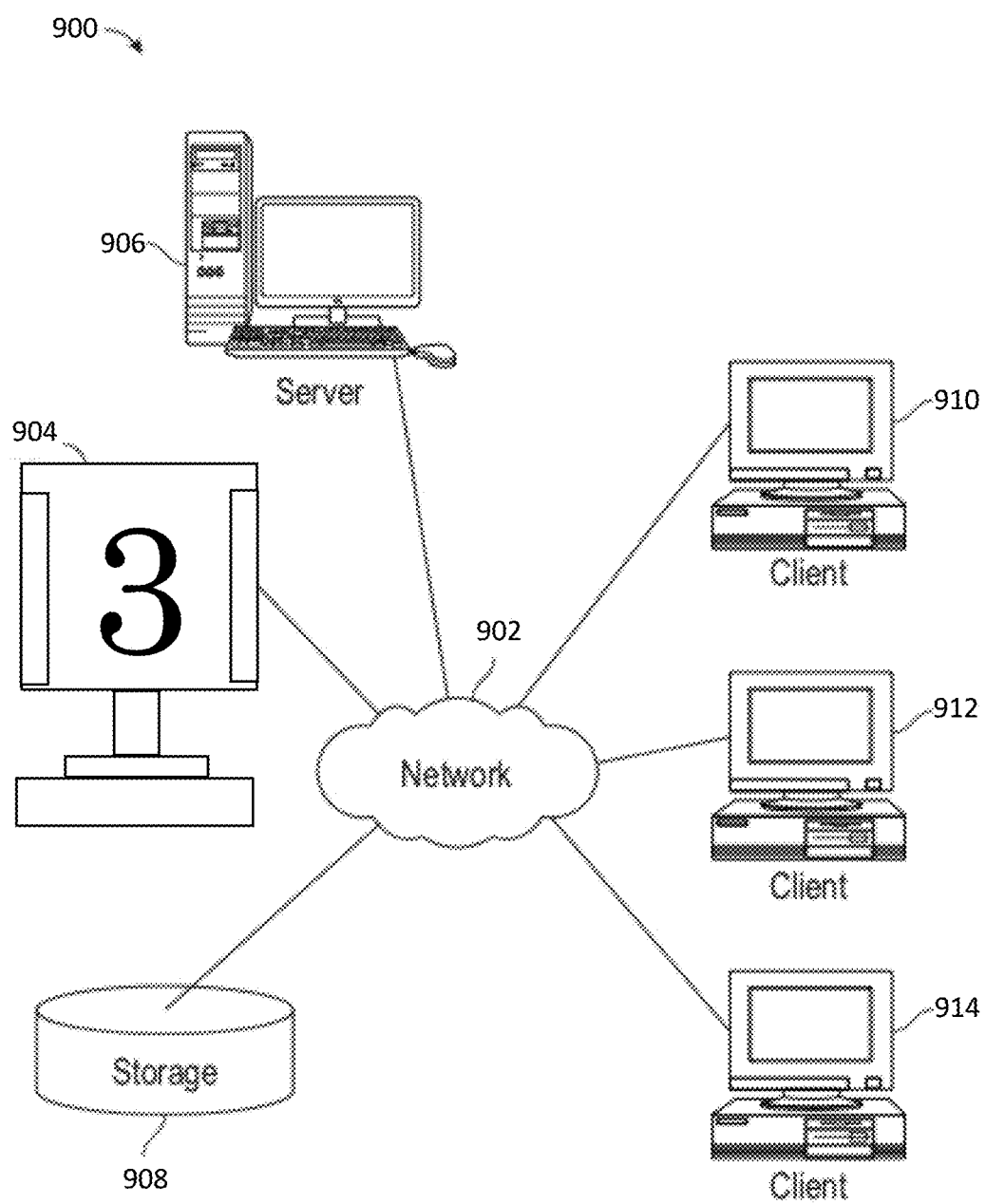
FIG. 9 depicts a graphical representation of a network of data-processing devices in which aspects of the present embodiments may be implemented.
Figure 10:
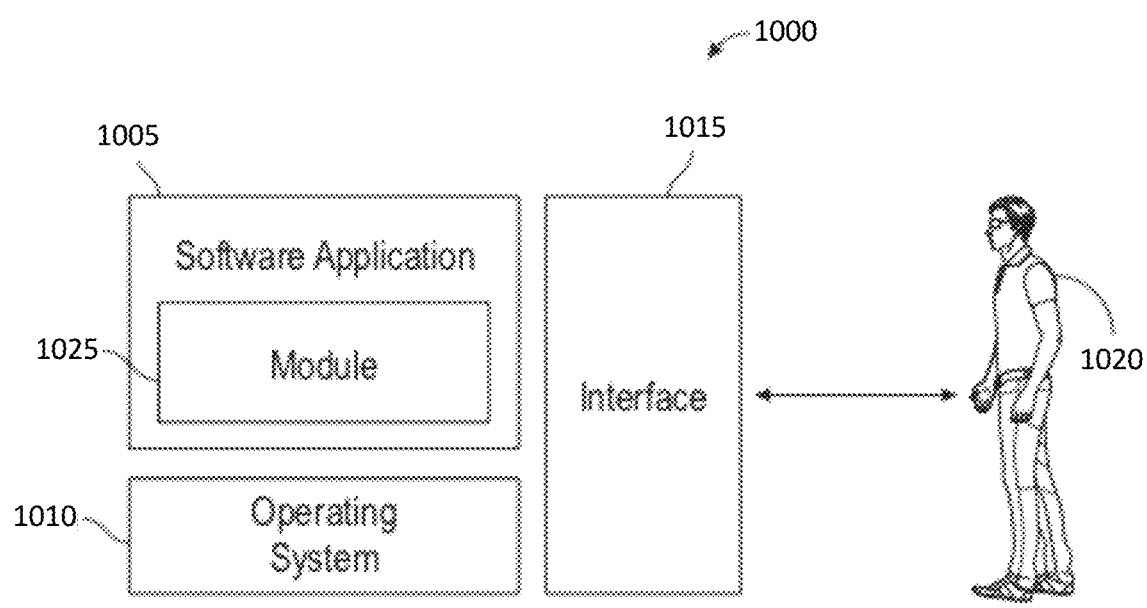
FIG. 10 depicts a computer software system for directing the operation of the data-processing system depicted in FIG. 1, in accordance with an embodiment.

FIGS. 8-10 are provided as exemplary diagrams of data-processing environments in which embodiments of the present invention may be implemented. It should be appreciated that FIGS. 8-10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 800 that executes programming for implementing parts of the methods and systems disclosed herein is shown in FIG. 1. A computing device in the form of a computer 810 configured to interface with sensors, peripheral devices, and other elements disclosed herein may include one or more processing units 802, memory 804, removable storage 812, and non-removable storage 814. Memory 804 may include volatile memory 806 and non-volatile memory 808. Computer 810 may include or have access to a computing environment that includes a variety of transitory and non-transitory computer-readable media such as volatile memory 806 and non-volatile memory 808, removable storage 812 and non-removable storage 814. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 810 may include or have access to a computing environment that includes input 816, output 818, and a communication connection 820. The computer may operate in a networked environment using a communication connection 820 to connect to one or more remote computers, remote sensors, detection devices, hand-held devices, multi-function devices (MFDs), mobile devices, tablet devices, mobile phones, Smartphones, or other such devices. The remote computer may also include a personal computer (PC), server, router, network PC, RFID enabled device, a peer device or other common network node, or the like. The communication connection may include a Local Area Network (LAN), a Wide Area Network (WAN), Bluetooth connection, or other networks. This functionality is described more fully in the description associated with FIG. 9 below.

Output 818 is most commonly provided as a computer monitor, but may include any output device. Output 818 and/or input 816 may include a data collection apparatus associated with computer system 800. In addition, input 816, which commonly includes a computer keyboard and/or pointing device such as a computer mouse, computer track pad, or the like, allows a user to select and instruct computer system 800. A user interface can be provided using output 818 and input 816. Output 818 may function as a display for displaying data and information for a user, and for interactively displaying a graphical user interface (GUI) 830.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 816 such as, for example, a pointing device such as a mouse and/or with a keyboard. A particular item can function in the same manner to the user in all applications because the GUI provides standard software routines (e.g., module 825) to handle these elements and report the user's actions. The GUI can further be used to display the electronic service image frames as discussed below.

Computer-readable instructions, for example, program module or node 825, which can be representative of other modules or nodes described herein, are stored on a computer-readable medium and are executable by the processing unit 802 of computer 810. Program module or node 825 may include a computer application. A hard drive, CD-ROM, RAM, Flash Memory, and a USB drive are just some examples of articles including a computer-readable medium.

FIG. 9 depicts a graphical representation of a network of data-processing systems 900 in which aspects of the present invention may be implemented. Network data-processing system 900 is a network of computers or other such devices such as mobile phones, smartphones, sensors, detection devices, and the like in which embodiments of the present invention may be implemented. Note that the system 900 can be implemented in the context of a software module such as program module 825. The system 900 includes a network 902 in communication with one or more clients 910, 912, and 914. Network 902 may also be in communication with one or more RFID, GPS, and/or Bluetooth enabled devices 904, servers 906, and storage 908. Network 902 is a medium that can be used to provide communications links between various devices and computers connected together within a networked data processing system such as computer system 800. Network 902 may include connections such as wired communication links, wireless communication links of various types, fiber optic cables, quantum, or quantum encryption, or quantum teleportation networks, etc. Network 902 can communicate with one or more servers 906, one or more external devices such as external device 904, and a memory storage unit such as, for example, memory or database 908. It should be understood that external device 904 may be embodied as a teaching aid system, microcontroller, controller, receiver, receiver module, transceiver, or other such device.

In the depicted example, external device 904, server 906, and clients 910, 912, and 914 connect to network 902 along with storage unit 908. Clients 910, 912, and 914 may be, for example, personal computers or network computers, hand-held devices, mobile devices, tablet devices, smartphones, personal digital assistants, microcontrollers, recording devices, MFDs, etc. Computer system 800 depicted in FIG. 8 can be, for example, a client such as client 910 and/or 912.

Computer system 800 can also be implemented as a server such as server 906, depending upon design considerations. In the depicted example, server 906 provides data such as boot files, operating system images, applications, and application updates to clients 910, 912, and/or 914. Clients 910, 912, and 914 and external device 904 are clients to server 906 in this example. Network data-processing system 900 may include additional servers, clients, and other devices not shown. Specifically, clients may connect to any member of a network of servers, which provide equivalent content.

In the depicted example, network data-processing system 900 is the Internet with network 902 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 900 may also be implemented as a number of different types of networks such as, for example, an intranet, a local area network (LAN), or a wide area network (WAN). FIGS. 8 and 9 are intended as examples and not as architectural limitations for different embodiments of the present invention.

FIG. 10 illustrates a software system 1000, which may be employed for directing the operation of the data-processing systems such as computer system 800 depicted in FIG. 8. Software application 1005, may be stored in memory 804, on removable storage 812, or on non-removable storage 814 shown in FIG. 8, and generally includes and/or is associated with a kernel or operating system 1010 and a shell or interface 1015. One or more application programs, such as module(s) or node(s) 825, may be "loaded" (i.e., transferred from removable storage 814 into the memory 804) for execution by the data-processing system 800. The data-processing system 800 can receive user commands and data through user interface 1015, which can include input 816 and output 818, accessible by a user 1020. These inputs may then be acted upon by the computer system 800 in accordance with instructions from operating system 1010 and/or software application 1005 and any software module(s) 825 thereof.

Generally, program modules (e.g., module 825) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smart phones, tablet devices, multi-processor systems, printers, copiers, fax machines, multi-function devices, data networks, microprocessorbased or programmable consumer electronics, networked personal computers, minicomputers, mainframe computers, servers, medical equipment, medical devices, and the like.

Note that the term module or node as utilized herein may refer to a collection of routines and data structures that perform a particular task or implements a particular abstract data type. Modules may be composed of two parts: an interface, which lists the constants, data types, variables, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 1015 (e.g., a graphical user interface 830) can serve to display results, whereupon a user 1020 may supply additional inputs or terminate a particular session. In some embodiments, operating system 1010 and GUI 830 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 1010 and interface 1015. The software application 1005 can include, for example, module(s) 825, which can include instructions for carrying out steps or logical operations such as those shown and described herein.

The following description is presented with respect to embodiments of the present invention, which can be embodied in the context of, or require the use of a data-processing system such as computer system 800, in conjunction with program module 825, and data-processing system 900 and network 902 depicted in FIGS. 8-10. The present invention, however, is not limited to any particular application or any particular environment. Instead, those skilled in the art will find that the systems and methods of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation.

Based on the foregoing, it can be appreciated that a number of embodiments, preferred and alternative, are disclosed herein. For example, in an embodiment, a teaching aid system comprises a housing, at least one compartment configured in said housing, at least one engagement tool, and a base connected to the housing.

In an embodiment, the housing further comprises at least one retaining strut formed on an exterior wall of the housing and at least one slot formed in a lip of the housing. In an embodiment, the system comprises further at least one identification plate engaged to the exterior wall of the housing with the at least one retaining strut. In an embodiment the system further comprises a coating formed on the identification plate, the coating comprising at least one of a blackboard coating and a whiteboard coating.

In an embodiment the base connected to the housing further comprises a dowel connecting the base to the housing and a race and bearing assembly.

In an embodiment, the at least one engagement tool further comprises at least one of stones, sticks, sand timers, stickie notes, markers, highlighters, post-it notes, and dice.

In an embodiment of the system, the at least one compartment further comprises one of: four equally sized compartments, one large compartment and two smaller compartments, two equally sized compartments, and one compartment.

In another embodiment, a teaching aid apparatus comprises a housing, at least one guide rail formed on an inner surface of said housing, at least one compartment configured in said housing, at least one engagement tool, and a base connected to the housing. In an embodiment of the apparatus the housing further comprises at least one retaining strut formed on an exterior wall of the housing, at least one slot formed in a lip of the housing, and at least one identification plate engaged to the exterior wall of the housing with the at least one retaining strut. In an embodiment, the apparatus further comprises a coating formed on the identification plate, the coating comprising at least one of: a blackboard coating, and a whiteboard coating.

In an embodiment of the apparatus, the base connected to the housing further comprises a dowel connecting the base to the housing. In an embodiment, the base connected to the housing further comprises a race and bearing assembly formed in the base and connected to the dowel.

In an embodiment the apparatus of claim 8 further comprises at least one latch configured to hold the at least one compartment in place.

In an embodiment, the at least one compartment further comprises one of four equally sized compartments, one large compartment and two smaller compartments, two equally sized compartments, and one compartment.

In yet another embodiment, a system comprises a housing, at least one guide rail formed on an inner surface of said housing, at least one compartment configured in said housing, at least one latch configured to hold the at least one compartment in the housing, at least one engagement tool, and a base connected to the housing. In an embodiment the housing further comprises at least one retaining strut formed on an exterior wall of the housing, at least one slot formed in a lip of the housing, and at least one identification plate engaged to the exterior wall of the housing with the at least one retaining strut. In an embodiment, the system further comprises an identifier formed on said identification plate.

In an embodiment, the base connected to the housing further comprises: a dowel connecting the base to the housing, and a race and bearing assembly formed in the base and connected to the dowel.

In an embodiment, the at least one engagement tool further comprises at least one of: stones, sticks, sand timers, stickie notes, markers, highlighters, post-it notes, and dice.

In an embodiment of the system, the at least one compartment further comprises one of: four equally sized compartments, one large compartment and two smaller compartments, two equally sized compartments, and one compartment.

In an embodiment, the system further comprises an electronic component, that can be battery operated. When activated, the system can provide a buzzer-like sound and lights on the housing can be activated. The activation button can be a separate unit, connected to the housing unit electronically via wired connection, blue tooth or similar wireless technologies.

It will be appreciated that variations of the above-disclosed and other features and functions, or alternatives thereof, may be desirably combined into many other different systems or applications. Also, it should be appreciated that various presently unforeseen or unanticipated alternatives, modifications, variations or improvements therein may be subsequently made by those skilled in the art which are also intended to be encompassed by the following claims.

What is claimed is:

1. A teaching aid system comprising:
   a housing comprising an exterior wall with a plurality of sides;
   a plurality of removable compartments configured in said housing;
   a plurality of engagement tools in each of the plurality of compartments, the plurality of engagement tools comprising stones, sticks, a sand timer, sticky notes, markers, highlighters, and dice;
   a base connected to the housing, the base further comprising a drawer;
   wherein said housing further comprises: at least one retaining strut formed on each side of the exterior wall of the housing; and at least one slot formed in a lip of the housing;
   at least one identification plate engaged to each side of the exterior wall of the housing with the at least one retaining strut; and a unique identifier on each side of the exterior wall of the housing, wherein each identification plate can be engaged in front of the unique identifier, and wherein each identification plate is configured to identify a student or group of students at whom the identification plate is pointing; and wherein each unique identifier on each of the plurality of identification plates corresponds to instructions for using one or more of the plurality of engagement tools in one or more of the removable compartments;
   a coating formed on each of the at least one identification plates, the coating comprising at least one of: a blackboard coating and a whiteboard coating.

2. The teaching aid system of claim 1 wherein the base connected to the housing further comprises:
   a dowel connecting the base to the housing;
   a race and bearing assembly;
   at least one stop configured in the race and bearing assembly configured to ensure the housing stops at each 90 degree rotation.

3. The teaching aid system of claim 1 wherein the plurality of compartments further comprises a plurality of nested compartments, wherein the nested compartments are removable from the housing.

4. The teaching aid system of claim 1 wherein said plurality of compartments further comprises one of: four equally sized compartments; one large compartment and two smaller compartments; and two equally sized compartments.

5. A teaching aid apparatus comprising:
   a housing;
   at least one guide rail formed on an inner surface of said housing;
   a plurality of removable compartments configured in said housing;
   a plurality of engagement tools in each of the plurality of compartments, the plurality of engagement tools comprising stones, sticks, a sand timer, sticky notes, markers, highlighters, and dice;
   a base connected to the housing;
   wherein said housing further comprises: at least one retaining strut formed on each side of the exterior wall of the housing; and at least one slot formed in a lip of the housing;
   at least one identification plate engaged to each side of the exterior wall of the housing with the at least one retaining strut; and a unique identifier on each side of the exterior wall of the housing, wherein each identification plate can be engaged in front of the unique identifier, and wherein each identification plate is configured to identify a student or group of students at whom the identification plate is pointing; and wherein each unique identifier on each of the plurality of identification plates corresponds to instructions for using one or more of the plurality of engagement tools in one or more of the removable compartments;
   a coating formed on each of the at least one identification plates, the coating comprising at least one of: a blackboard coating and a whiteboard coating.

6. The teaching aid apparatus of claim 5 wherein the base connected to the housing further comprises:
   a dowel connecting the base to the housing.

7. The teaching aid apparatus of claim 6 wherein the base connected to the housing further comprises:
   a race and bearing assembly formed in the base and connected to the dowel.

8. The teaching aid apparatus of claim 5 further comprising at least one latch configured to hold the at least one of the plurality of compartments in place.

9. The teaching aid apparatus of claim 5 wherein said plurality of compartments further comprises one of: four equally sized compartments; one large compartment and two smaller compartments; and two equally sized compartments.

10. A system comprising:
    a housing;
    at least one guide rail formed on an inner surface of said housing;
    a plurality of removable compartments configured in said housing;
    at least one latch configured to hold at least one of the plurality of compartments in the housing;
    a plurality of engagement tools in each of the plurality of compartments, the plurality of engagement tools comprising: stones, sticks, a sand timer, sticky notes, markers, highlighters, and dice; and
    a base connected to the housing;
    wherein said housing further comprises: at least one retaining strut formed on each side of the exterior wall of the housing; and at least one slot formed in a lip of the housing;
    at least one identification plate engaged to each side of the exterior wall of the housing with the at least one retaining strut; and a unique identifier on each side of the exterior wall of the housing, wherein each identification plate can be engaged in front of the unique identifier, and wherein each identification plate is configured to identify a student or group of students at whom the identification plate is pointing; and wherein each unique identifier on each of the plurality of identification plates corresponds to instructions for using one or more of the plurality of engagement tools in one or more of the removable compartments;
    a coating formed on each of the at least one identification plates, the coating comprising at least one of: a blackboard coating and a whiteboard coating.

11. The system of claim 10 wherein the base connected to the housing further comprises:
    a dowel connecting the base to the housing; and
    a race and bearing assembly formed in the base and connected to the dowel.

12. The system of claim 10 further comprising:
a student buzzer; and
a loudspeaker configured to make a sound when the student buzzer is depressed.

13. The system of claim 10 wherein said plurality of compartments further comprises one of: four equally sized compartments; one large compartment and two smaller compartments; and two equally sized compartments.

* * * * *